(No Model.) 2 Sheets—Sheet 1.
G. COTTRELL.
POWER MECHANISM.
No. 378,192. Patented Feb. 21, 1888.
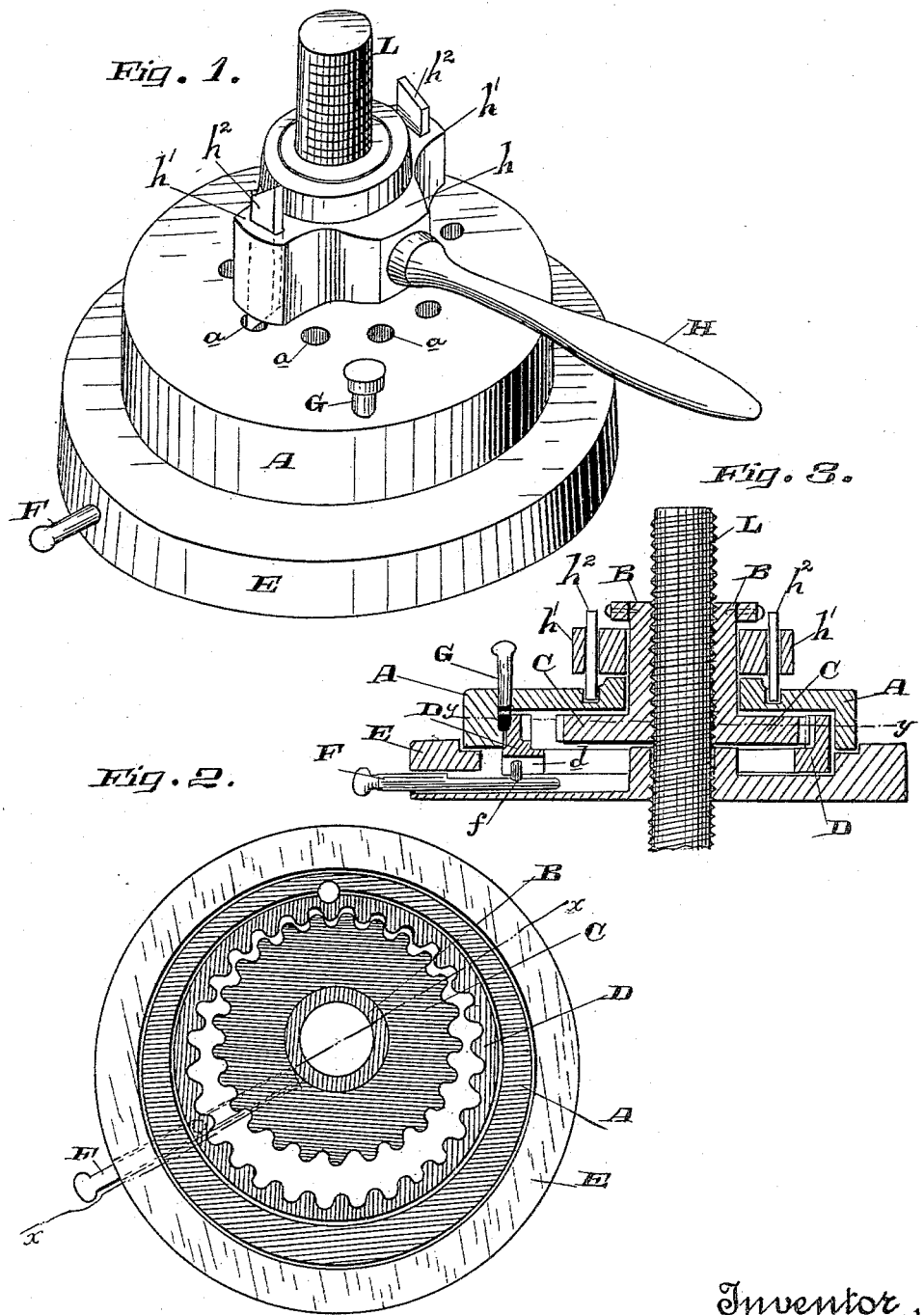

(No Model.) 2 Sheets—Sheet 2.

G. COTTRELL.
POWER MECHANISM.

No. 378,192. Patented Feb. 21, 1888.

Witnesses,
Geo. C. Strong.
J. H. Rourke.

Inventor.
Geo. Cottrell.
By Dewey & Co.
att'ys

UNITED STATES PATENT OFFICE.

GEORGE COTTRELL, OF SAN FRANCISCO, CALIFORNIA.

POWER MECHANISM.

SPECIFICATION forming part of Letters Patent No. 378,192, dated February 21, 1888.

Application filed July 21, 1887. Serial No. 244,952. (No model.)

*To all whom it may concern:*

Be it known that I, GEORGE COTTRELL, of the city and county of San Francisco, State of California, have invented an Improvement in Power Mechanism; and I hereby declare the following to be a full, clear, and exact description of the same.

My invention relates to that class of power mechanisms employing differential gears, and in which an eccentric operates upon a swaying toothed disk which engages with a gear having a different number of teeth, whereby the power transmitted to said gear is a differential one.

My invention consists in the constructions and combinations, which I shall hereinafter fully describe and claim.

The general object of my invention is to provide a differential power mechanism which is applicable to all machines which require the rotation of an inner part by means of power applied primarily to an outer part, such, for example, as capstans and presses.

The particular object is to provide a suitable power mechanism for a wine or cider press, which is adapted to vary its power to conform to the demands of the work.

Figure 4:
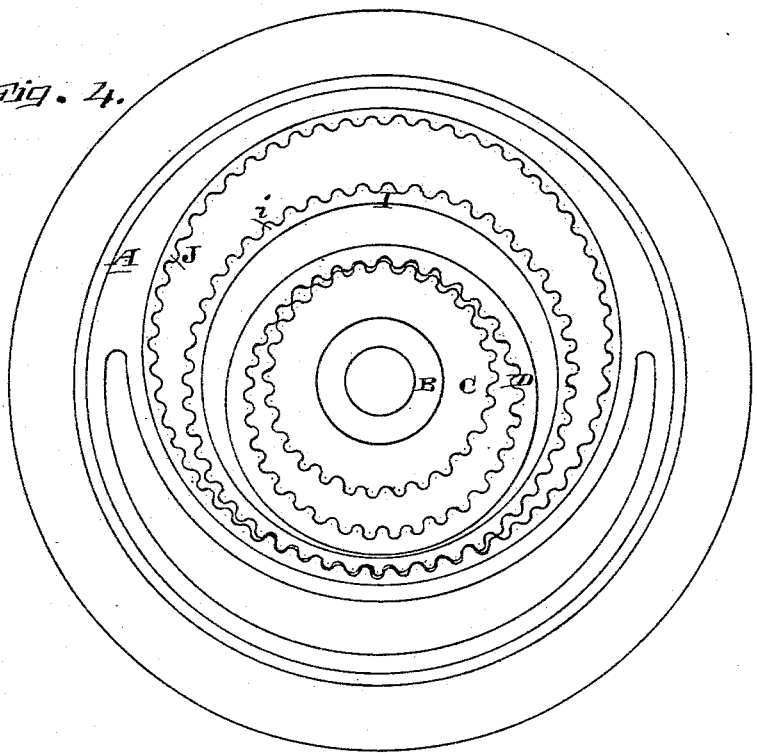
Figure 5:
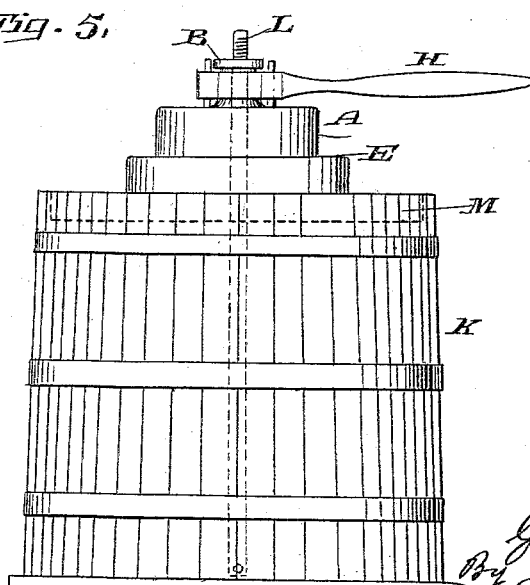

Referring to the accompanying drawings for a more complete explanation of my invention, Figure 1 is a perspective view of my mechanism. Fig. 2 is a horizontal section of same on line $y$ $y$ of Fig. 3. Fig. 3 is a vertical section on the line $x$ $x$ of Fig. 2. Fig. 4 is a plan of a modification. Fig. 5 is an elevation showing the application of my mechanism to a wine-press.

A is the outer eccentric, consisting of a circular piece or cap, the inner surface of the rim of which is eccentric to its center.

B is an inner part, which is here shown as a nut, and C is a pinion on said nut. The nut is mounted loosely in the center of the eccentric A, so that each may have independent rotation.

D is the annular swaying disk, having its outer surface smooth and fitting within the eccentric A and its inner surface toothed and engaging the pinion C on the central nut, B. The disk D and the pinion C have a differential number of teeth. Now, it will readily be seen that if the disk D is so held that it cannot rotate, but can only sway or move back and forth in transverse planes, the rotation of the eccentric A, acting through the swaying disk D, will transmit a differential rotation to the pinion C and nut B. The parts are here shown as fitted horizontally to an annularly-grooved bed, E, and seated in the bed radially is a pin or bolt, F, having a stud, $f$, which engages with a radial groove or slot, $d$, in the lower face of the disk D, whereby said disk may move back and forth or sway, and yet cannot rotate; but when the pin is withdrawn outwardly far enough to disengage its stud from the disk the latter is relieved, and then, when locked to the eccentric-cap A, by means of a vertically-movable pin, G, passing down through semicircular seats in the adjacent surface of the two parts, both disk and cap rotate together and the motion transmitted to the central nut is simple or direct.

As a means for applying the primary power to the eccentric-cap A, I here show a lever, H, having a head, $h$, loosely fitted on the nut B, and provided with socketed ears $h'$, through which gravitate pawls $h^2$, which engage sockets or holes $a$, arranged in annular series in the upper surface of the cap A.

I am aware that the principle of the mechanical movement I have described is not new of itself, for in chain-blocks and hoisting mechanisms differential gears can be found operated by an eccentric; but from the nature of the application the eccentric is in the form of a central shaft operating through the swaying disk to transmit its power to an outside drum, and such a construction is not applicable to mechanism which requires the rotation of an inner part by power applied to the outside.

It is obvious that the multiplication of power by these means may be carried to as great an extent as is desirable. Thus in Fig. 4 I show the use of a second eccentric, I, and second swaying toothed disk J, the only change in this being that the second eccentric has to be provided with external teeth, $i$, in order to derive its rotation from the outer swaying disk, said eccentric and disk having, of course, a differential number of teeth. As I have heretofore said this mechanism though adapted for all machines where an internal part has to be rotated by power primarily applied to an outer part—such, for example, as a capstan—is particularly applicable to a press for wine, cider, &c.; and to illustrate this portion of my invention I have in the first place shown the part B as a nut, and I shall now, by referring to Fig. 5, continue the description.

K is the basket of a wine-press, and L is a screw fixed rigidly in its center. This screw passes through and engages the nut B, and the bed E is secured firmly to or forms a part of the follower M, which plays in the basket. Now, when the operation is beginning and power is less important than speed, I relieve the swaying disk D of the stud $f$ by withdrawing pin F, and I lock said disk to the eccentric A by the pin G. The movement of the lever H thereupon applies a simple or direct power to the nut B, so that it runs down rapidly on the screw and forces the follower down; but when the grapes offer greater resistance and more power has to be applied I unlock the eccentric by withdrawing pin G, and I lock the swaying disk by inserting pin F, so that the power of the lever is multiplied to accomplish the necessary movement of the follower.

Having thus described my invention, what I claim as new, and desire to secure by Letters Patent, is—

1. A power mechanism comprising an outer rotary eccentric, an inner rotary toothed part, and an intervening swaying toothed disk or gear acted upon by the outer eccentric and engaging the inner part, the teeth of said inner part and swaying disk or gear being differential in number, substantially as herein described.

2. A power mechanism comprising an outer rotary eccentric to which the power is primarily applied, an inner rotary part having external teeth, and a swaying annular disk intervening between the outer eccentric and the inner part, said disk engaging the eccentric externally, and having internal teeth engaging the teeth of the inner part and differential in point of number, substantially as herein described.

3. A power mechanism comprising an outer rotary eccentric to which the power is primarily applied, an inner rotary part having external teeth, an annular disk intervening between the outer eccentric and the inner part, said disk engaging the eccentric externally, and having internal teeth engaging the teeth of the inner part and differential in point of number, and a lock for the annular disk, whereby it is permitted to sway by the action of the eccentric, but is prevented from rotating, substantially as herein described.

4. A power mechanism comprising an outer rotary eccentric to which the power is primarily applied, an inner rotary part having external teeth, a swaying annular disk intervening between the outer eccentric and the inner part, said disk engaging the eccentric externally, and having internal teeth engaging the teeth of the inner part and differential in point of number, a sliding pin seated in the frame of the mechanism for locking the disk to prevent its rotating and for relieving it again, and a sliding pin for locking the eccentric and disk together, whereby they may rotate in unison, substantially as herein described.

5. A power mechanism comprising an outer rotary eccentric, an inner rotating toothed part, a swaying annular gear engaging said inner part, and having its teeth differential in point of number to the teeth of said part, an eccentric operating externally on said swaying gear and having external teeth, and a swaying annular disk intervening between the outer eccentric and the inner eccentric, and having internal teeth engaging and differential in point of number to the teeth of said inner eccentric, substantially as herein described.

6. In combination with the basket, the follower, and the fixed screw of a press, the mechanism for operating the follower, consisting of an externally-toothed nut traveling on the screw and bearing in the follower, a swaying annular disk having internal teeth engaging the teeth of the nut and differential in point of number, and an outer rotary eccentric encircling and actuating the swaying disk, substantially as herein described.

7. In combination with the basket, the follower, and the fixed screw of a press, the mechanism for operating the follower, consisting of an externally-toothed nut traveling on the screw and bearing in the follower, a swaying annular disk having internal teeth engaging the teeth of the nut and differential in point of number, an outer eccentric encircling and actuating the swaying disk, a lever for rotating the eccentric, a sliding pin for locking and relieving the swaying disk, and a sliding pin for locking the eccentric and disk together and for relieving them, substantially as herein described.

In witness whereof I have hereunto set my hand.

GEORGE COTTRELL.

Witnesses:
S. H. NOURSE,
H. C. LEE.